US012089743B2

(12) United States Patent
Tarumi

(10) Patent No.: US 12,089,743 B2
(45) Date of Patent: Sep. 17, 2024

(54) FOLDING STEPSTOOL

(71) Applicant: TOMATO FUDOSAN CO., LTD., Miyagi (JP)

(72) Inventor: Masashi Tarumi, Katta-gun (JP)

(73) Assignee: TOMATO FUDOSAN CO., LTD., Miyagi (JP)

( * ) Notice: Subject to any disclaimer, the term of this patent is extended or adjusted under 35 U.S.C. 154(b) by 886 days.

(21) Appl. No.: 17/268,766

(22) PCT Filed: Sep. 21, 2018

(86) PCT No.: PCT/JP2018/035145
§ 371 (c)(1),
(2) Date: May 5, 2021

(87) PCT Pub. No.: WO2020/035959
PCT Pub. Date: Feb. 20, 2020

(65) Prior Publication Data

US 2021/0337973 A1 Nov. 4, 2021

(30) Foreign Application Priority Data

Aug. 16, 2018 (JP) ................................. 2018-153251

(51) Int. Cl.
*A47C 12/00* (2006.01)
*E06C 1/393* (2006.01)

(52) U.S. Cl.
CPC .............. *A47C 12/00* (2013.01); *E06C 1/393* (2013.01)

(58) Field of Classification Search
CPC .. A47C 12/00; A47C 4/10; A47C 4/20; E06C 1/393; A47B 3/083; A47B 2003/0827; A47B 2003/0821
USPC ........ 108/115, 118–120, 129–132, 162, 171, 108/173–175
See application file for complete search history.

(56) References Cited

U.S. PATENT DOCUMENTS

| | | | | |
|---|---|---|---|---|
| 60,841 A * | 1/1867 | Dust | A47B 11/00 108/94 |
| 2,362,116 A * | 11/1944 | Covell | A47B 3/083 108/35 |
| 4,392,437 A * | 7/1983 | Wallace | A47B 3/00 108/172 |

FOREIGN PATENT DOCUMENTS

JP 2002-364278 A 12/2002

OTHER PUBLICATIONS

Nov. 20, 2018 International Search Report of International Application No. PCT/JP2018/035145.
Nov. 20, 2018 Written Opinion of International Application No. PCT/JP2018/035145.

* cited by examiner

*Primary Examiner* — Brian D Mattei
*Assistant Examiner* — Jacob G Sweeney
(74) *Attorney, Agent, or Firm* — Oliff PLC

(57) ABSTRACT

A folding stepstool which can be folded into a shape which enables the folding stepstool to be carried easily. In a folding stepstool, a front leg and a rear leg can be housed in a recess-shaped first space in the lower surface of a first top board, and a front leg and a rear leg can be housed in a recess-shaped second space in the lower surface of a second top board. Further, when the top plates are closed, the two front legs and the two rear legs can be housed in the internal spaces in the top plates in a closed state.

6 Claims, 9 Drawing Sheets

(a)

(b)

(a)

(b)

FOLDING STEPSTOOL

CROSS-REFERENCE

This application is a U.S. national phase entry of International Application No. PCT/JP2018/035145 which was filed on Sep. 21, 2018 and which claims priority from Japanese Patent Application No. 2018-153251 filed on Aug. 16, 2018, and the disclosures of International Application No. PCT/JP2016/062860 and Japanese Patent Application No. 2018-153251 are incorporated herein by reference in their entirety.

TECHNICAL FIELD

The present disclosure relates to a folding stepstool.

BACKGROUND ART

As a folding stepstool, there is conventionally known a stepstool having a pair of ladder-like supporting legs that is foldable to overlap with a plate-like top board (see, for example, Japanese Patent Application Laid-open No. 2002-364278).

SUMMARY

The folding stepstool described in Japanese Patent Application Laid-open No. 2002-364278 1 can be folded so that the ladder-like supporting legs overlap with a lower side of the plate-like top board. The folding stepstool in the folded state is thus downsized compared to its used state. However, even when the ladder-like supporting legs are folded, the stepping stool has a plate-like shape as a whole, and is bulky and difficult to carry.

For example, there are user's demands to carry the folding stepstool to use it as scaffolding for photography. However, commercially available folding stepstools including the folding stepstool described in Patent Literature 1 have a plate-like shape as a whole even in a state of being folded. These folding stepstools are thus bulky even in a state of being folded, making it unsuitable for users to carry.

An object of the present disclosure is to provide a folding stepstool that can be folded in a shape capable of being carried around easily.

According to an aspect of the present disclosure, there is provided a folding stepstool, including:

- a top board extending in a first direction and in a second direction orthogonal to the first direction, the top board including:
  - a first top board of which back surface is formed having a recessed first space,
  - a second top board of which back surface is formed having a recessed second space, the second top board being arranged side by side with the first top board in the first direction, and
  - a hinge that pivotally connects the first top board and the second top board so that back surfaces of the first top board and the second top board get closer to each other,
- a first leg portion provided at a first end in the second direction of a back surface of the top board, the first leg portion having a first leg disposed at the back surface of the first top board and a second leg disposed at the back surface of the second top board,
- a first guide rail provided at the first end in the second direction of the back surface of each of the first top board and the second top board, and configured to guide the second leg so that the second leg is slidably movable to the back surface of the first top board,
- a second leg portion provided at a second end in the second direction of the back surface of the top board, the second leg portion having a third leg disposed at the back surface of the first top board and a fourth leg disposed at the back surface of the second top board,
- a second guide rail provided at the second end in the second direction of the back surface of each of the first top board and the second top board, and configured to guide the third leg so that the third leg is slidably movable to the back surface of the second top board,
- wherein the first leg and the second leg are configured to be accommodated in the first space of the first top board in a state where the first leg and the second leg are positioned on the back surface of the first top board,
- the third leg and the fourth leg are configured to be accommodated in the second space of the second top board in a state where the third leg and the fourth leg are positioned on the back surface of the second top board, and
- the top board is configured to be pivotable so that the back surfaces of the first top board and the second top board get closer to each other in the state where the first leg and the second leg are accommodated in the first space of the first top board and in the state where the third leg and the fourth leg are accommodated in the second space of the second top board.

In the folding stepstool according to the present disclosure, the first leg and the second leg can be accommodated in the first space of the lower surface of the first top board, and the third leg and the fourth leg can be accommodated in the second space of the lower surface of the second top board. Closing the top board under the above state allows the first to fourth legs to be accommodated in the internal space of the top board having the closed state. Accordingly, the folding stepstool can be folded in a substantially prism (rectangular column) shape, and is easy to carry.

Figure 5:
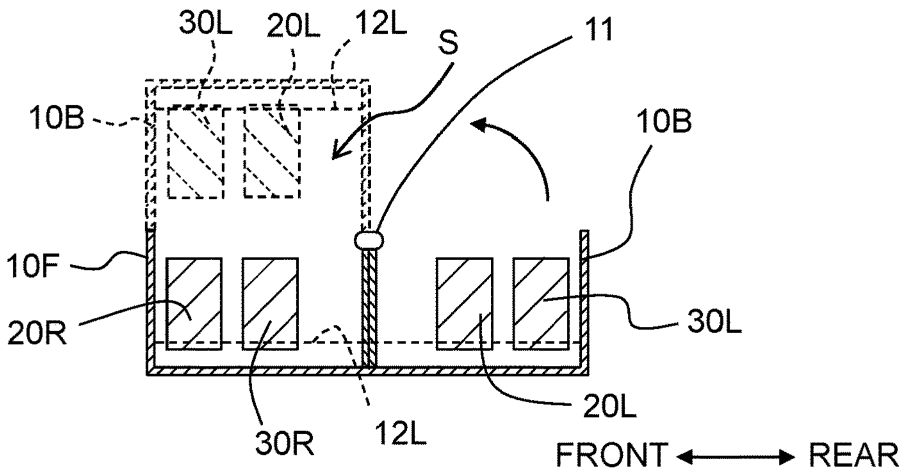
FIGS. 5A and 5B are schematic views for illustrating a folded state of the folding stepstool 1.
Figure 5:
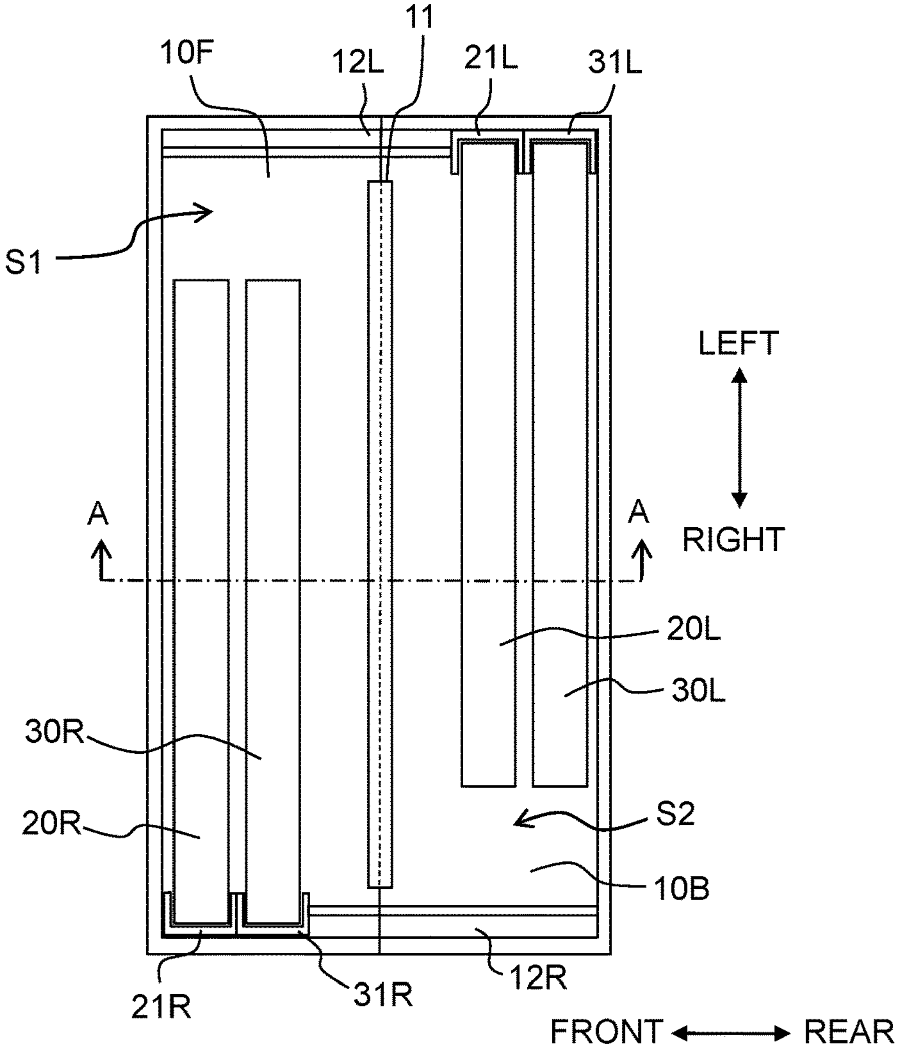

9B is a diagram that corresponds to FIG. 5A, illustrating a state where the top board 210 is folded.

DESCRIPTION OF EMBODIMENTS

Referring to the drawings, explanation is made about a folding stepstool 1 according to an embodiment of the present disclosure. In the present specification, respective directions are defined based on a front-rear direction, a left-right direction, and an up-down direction indicated by arrows in FIG. 1.

Figure 1:
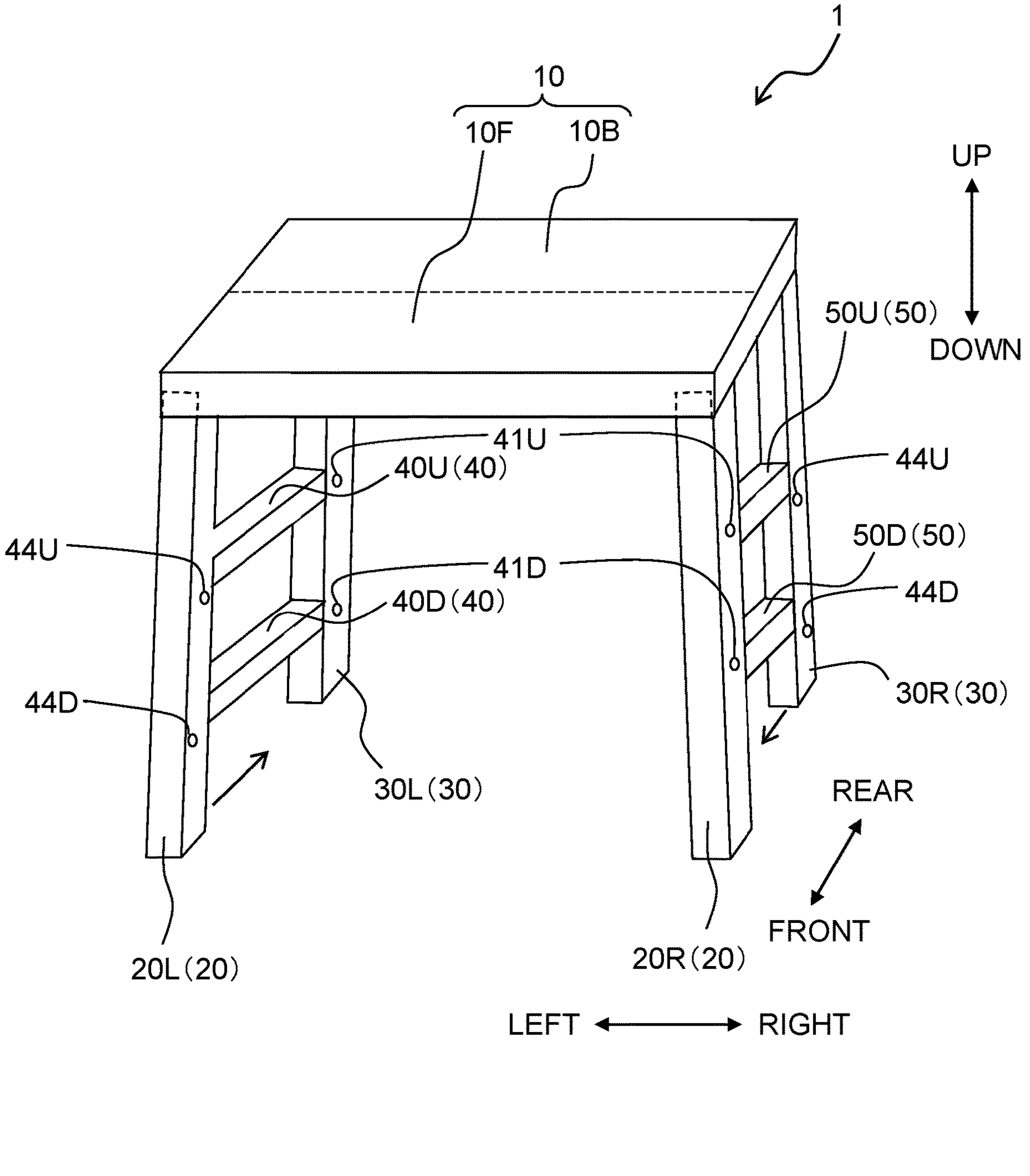
FIG. 1 schematically depicts a used state of a folding stepstool 1.
Figure 2:
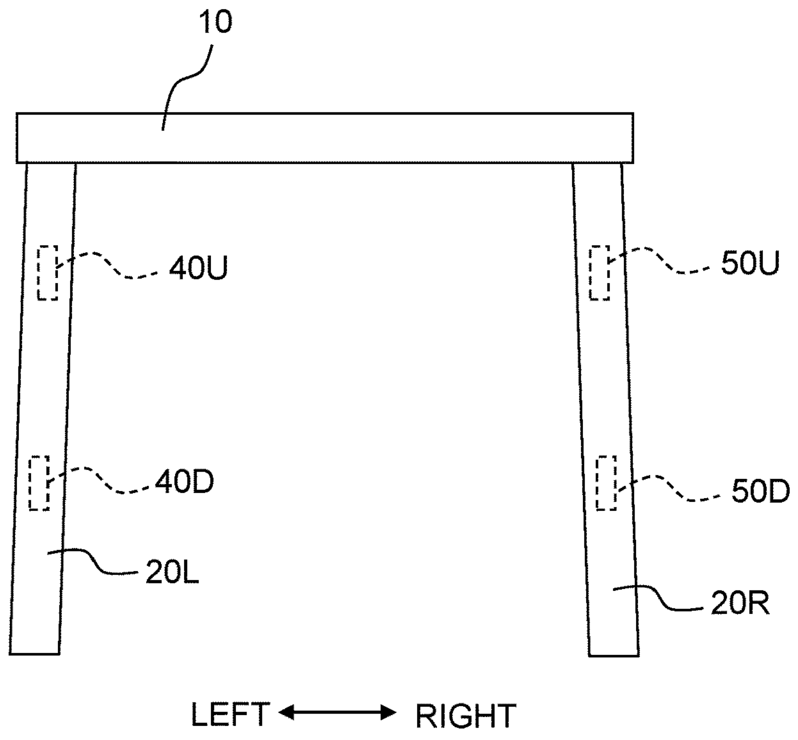
FIG. 2A is a side view of the folding stepstool 1 when seen from a front side.
FIG. 2B is a side view of the folding stepstool 1 when seen from a left side.
Figure 2:
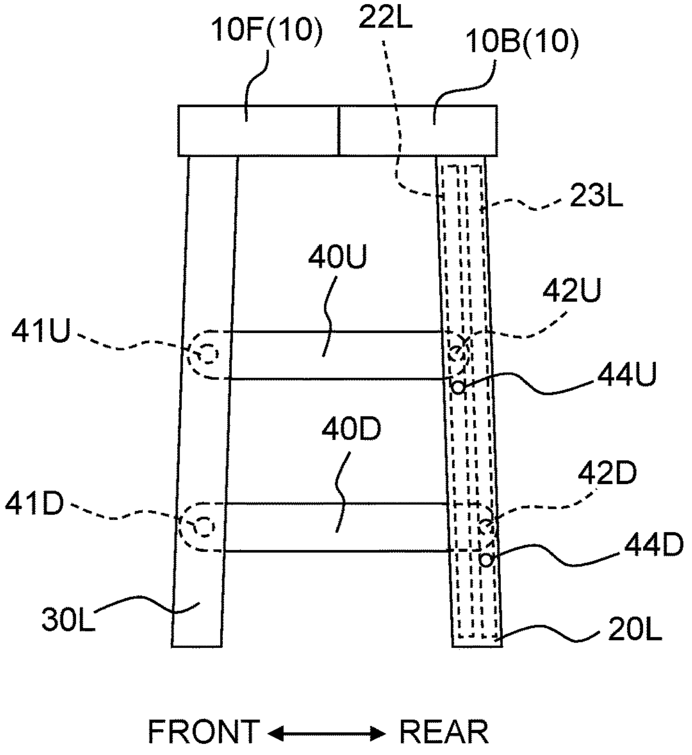

FIG. 1 schematically depicts a used state of the folding stepstool 1. FIG. 2A is a side view of the folding stepstool 1 when seen from the front side, and FIG. 2B is a side view of the folding stepstool 1 when seen from the left side. As depicted in FIG. 1, the folding stepstool 1 according to this embodiment mainly includes a top board 10, two front legs 20 (front leg 20L and front leg 20R), two rear legs 30 (rear leg 30L and rear leg 30R), two rungs 40 (rung 40U and rung 40D) arranged between the front leg 20L and the rear leg 30L, and two rungs 50 (rung 50U and rung 50D) arranged between the front leg 20R and the rear leg 30R.

<Top Board 10>

The top board 10 includes a first top board 10F, a second top board 10B, a hinge 11 (see FIGS. 5A and 5B) connecting the top board 10F and the top board 10B, and two slide rails 12L and 12R (see FIG. 5B). Each of the first top board 10F and the second top board 10B has a rectangular shape that is long in the left-right direction in top view. The first top board 10F and the second top board 10B have substantially the same size. The first top board 10F is disposed at the front side of the second top board 10B. As depicted in FIG. 5A, the cross-sectional shape of each of the first top board 10F and the second top board 10B is a substantially a U-letter.

As depicted in FIG. 5B, the hinge 11 extending in the left-right direction connects a lower surface of the first top board 10F and a lower surface of the second top board 10B. As indicated by dotted line in FIG. 5A, the second top board 10B can pivot about the hinge 11 to overlap with the upper side of the first top board 10F. Instead, the first top board 10F can pivot about the hinge 11 to overlap with the upper side of the second top board 10B. In the following explanation, a state where the first top board 10F and the second top board 10B are arranged side by side in the left-right direction as depicted by solid lines in FIG. 5A is referred to as a state where the top board 10 is opened (opened state). A state where the first top board 10F and the second top board 10B are arranged side by side in the up-down direction as depicted by dotted line in FIG. 5B is referred to as a state where the top board 10 is closed (closed state). A recessed first space S1 is formed in the lower surface of the first top board 10F and a recessed second space S2 is formed in the lower surface of the second top board 10B in a state where the top board 10 is opened. The first top board 10F and the second top board 10B form a hollow prism (hollow rectangular column) having an internal space S in a state where the top board 10 has the closed state. That is, the internal space S is formed by connecting the recessed first space S1 of the lower surface of the first top board 10F and the recessed second space S2 of the lower surface of the second top board 10B.

Figure 6:
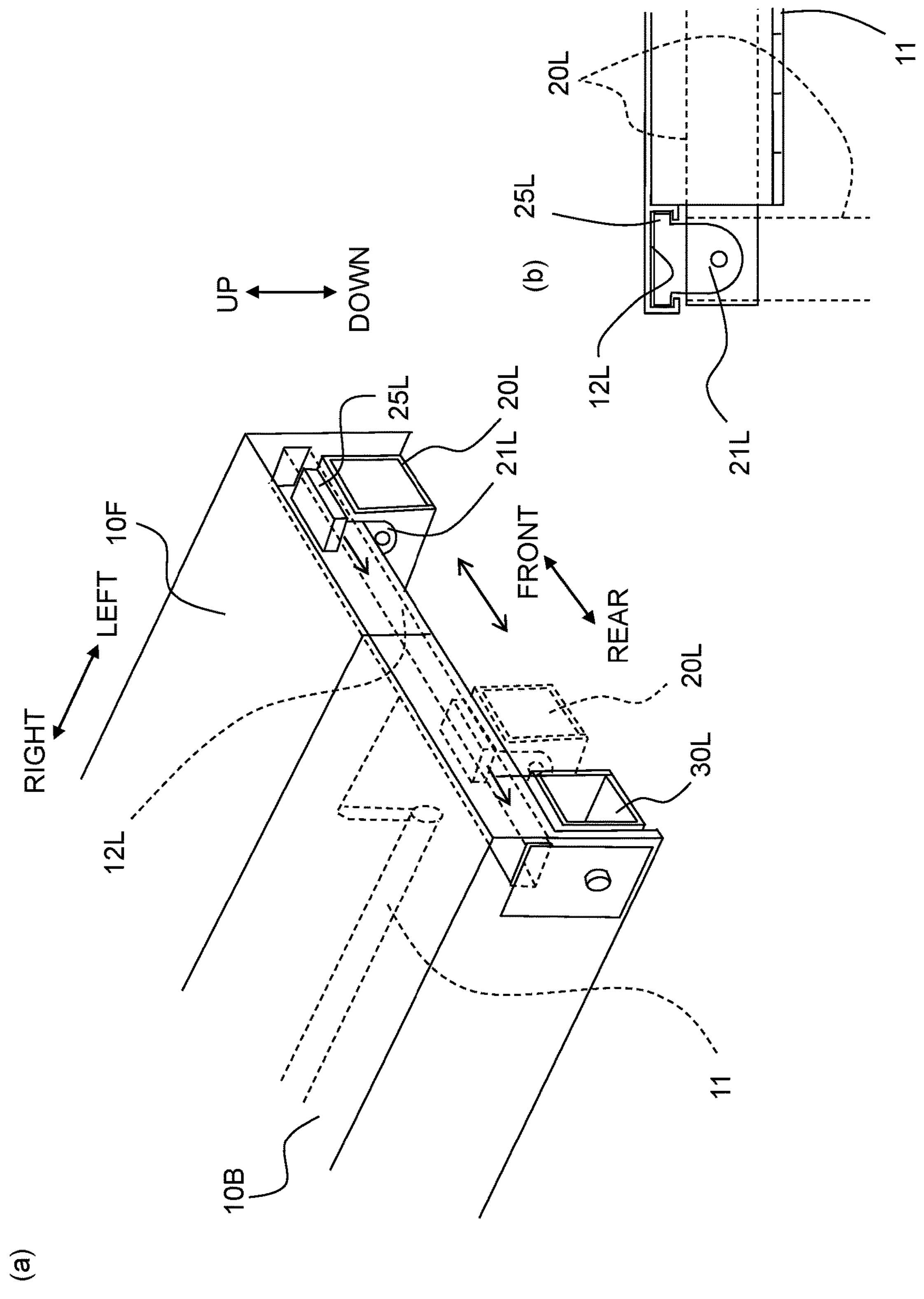
FIGS. 6A and 6B are partial enlarged views for illustrating a slide rail 12L, wherein a rail receiving member 25L in FIG. 6A is depicted by solid lines to make FIG. 6A to be easily understood.

As depicted in FIG. 5B, FIG. 6A, and FIG. 6B, the slide rail 12L extending in the front-rear direction is provided at a left end on a back side of the top board 10. A slide rail 12R extending in the front-rear direction is provided at a right end on the back side of the top board 10 (see FIG. 5B). As described below, the front leg 20L is attached to the slide rail 12L to be slidably movable therealong. The front leg 20L is slidably movable in the front-rear direction along the slide rail 12L from a left front corner of the top board 10F toward the rear leg 30L. The rear leg 30R is attached to the slide rail 12R to be slidably movable therealong. The rear leg 30R is slidably movable in the front-rear direction along the slide rail 12R from a right rear corner of the top board 10B toward the front leg 20R.

<Front Legs 20, Rear Legs 30>

As depicted in FIG. 1, FIG. 2A, and FIG. 2B, the front legs 20 (front leg 20L and front leg 20R) and the rear legs 30 (rear leg 30L and rear leg 30R) are provided at the lower side of the top board 10. The front leg 20L and the rear leg 30L are arranged to face each other in the front-rear direction. Each of the front leg 20L and the rear leg 30L is an exemplary first leg portion of the present disclosure. An interval in the front-rear direction between the front leg 20L and the rear leg 30L may have a truncated chevron shape (an inverted substantially V-shape) in which an interval at the lower side is slightly larger than an interval at the upper side. The cross-sectional shape of the front leg 20L is substantially a U-letter in which an end facing the rear leg 30L is opened (see FIGS. 4A and 4B). Similarly, the cross-sectional shape of the rear leg 30L is substantially a U-letter in which an end facing the front leg 20L is opened. An internal space that is long in the up-down direction is defined in each of the front leg 20L and the rear leg 30L. As depicted in FIG. 2B, two guide rails 22L, 23L extending in the up-down direction are formed in the front leg 20L. The guide rail 22L and the guide rail 23L are arranged in the front-rear direction. The guide rail 23L is positioned at the front side of the guide rail 22L. Similar to the front leg 20L and the rear leg 30L, the front leg 20R and the rear leg 30R are arranged to face each other in the front-rear direction. Each of the front leg 20R and the rear leg 30R is an exemplary second leg portion of the present disclosure. An interval in the front-rear direction between the front leg 20R and the rear leg 30R may have a truncated chevron shape (an inverted substantially V-shape) in which an interval at the lower side is slightly larger than an interval at the upper side. The cross-sectional shape of the front leg 20R is substantially a U-letter in which an end facing the rear leg 30R is opened. The cross-sectional shape of the rear leg 30R is substantially a U-letter in which an end facing the front leg 20R is opened. An internal space that is long in the up-down direction is defined in each of the front leg 20R and the rear leg 30R. Two guide rails that are similar to those of the front leg 20L are formed in the rear leg 20R.

The slide rail 12L of the top board 10 is provided with the front leg 20L. The front leg 20L has a hinge 21L (see FIG. 5B, FIG. 6A, and FIG. 6B). The front leg 20L can pivot about the hinge 21L to move toward the top board 10. As depicted in FIGS. 6A and 6B, a rail receiving member 25L is provided in an upper portion of the hinge 21L. The rail receiving member 25L, which is a substantially rectangular parallelepiped member, is slidably supported by the slide rail 12L. Slide movement in the left-right direction of the rail receiving member 25L along the slide rail 12L causes the front leg 20L to slidably move in the front-rear direction along the slide rail 12L from the left front corner of the first top board 10F toward the rear leg 30L, as described above. The rear leg 30L is provided at a left rear corner of the second top board 10B. The rear leg 30L has a hinge 31L (see FIG. 5B). The rear leg 30L can pivot about the hinge 31L to move toward the top board 10. No rail receiving member is provided in the hinge 30L. The front leg 20R is provided at a right front corner of the first top board 10F. The front leg 20R has a hinge 21R, and the front leg 20R can pivot about the hinge 21R to move toward the top board 10. The slide rail 12R of the top board 10 is provided with the rear leg 30R, and the rear leg 30R is slidably movable along the slide rail 12R. The rear leg 30R has a hinge 31R, and the rear leg 30R can pivot about the hinge 31R to move toward the top board 10. Although not depicted in the drawings, a member similar to the rail receiving member 25L is provided in the hinge 31R. The rear leg 30R can be slidably movable in the front-rear direction along the slide rail 12R from the right rear corner of the top board 10F toward the front leg 20R, as described above.

<Rungs 40U, 40D>

Figure 3:
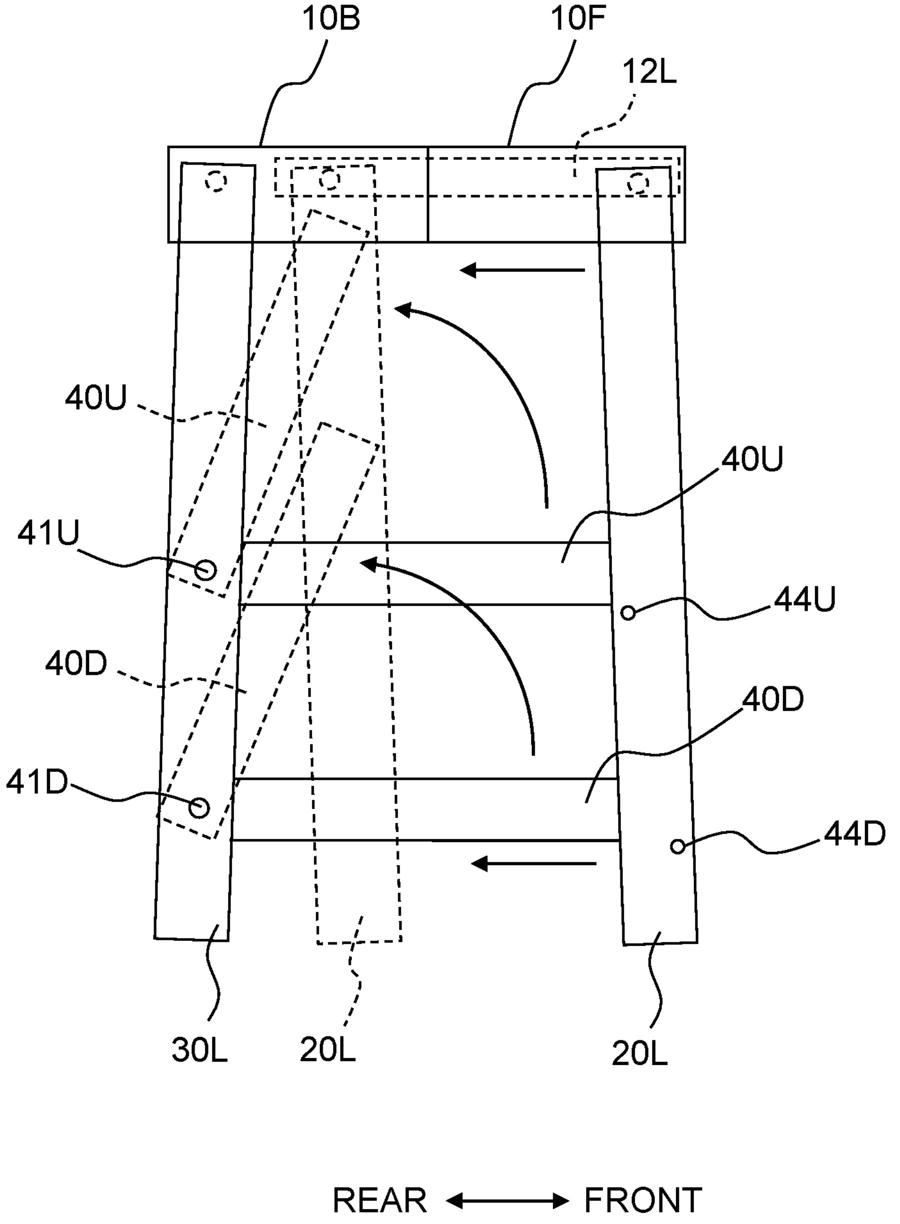
FIG. 3 illustrates a case where slide movement of a front leg 20L is performed.
Figure 4:
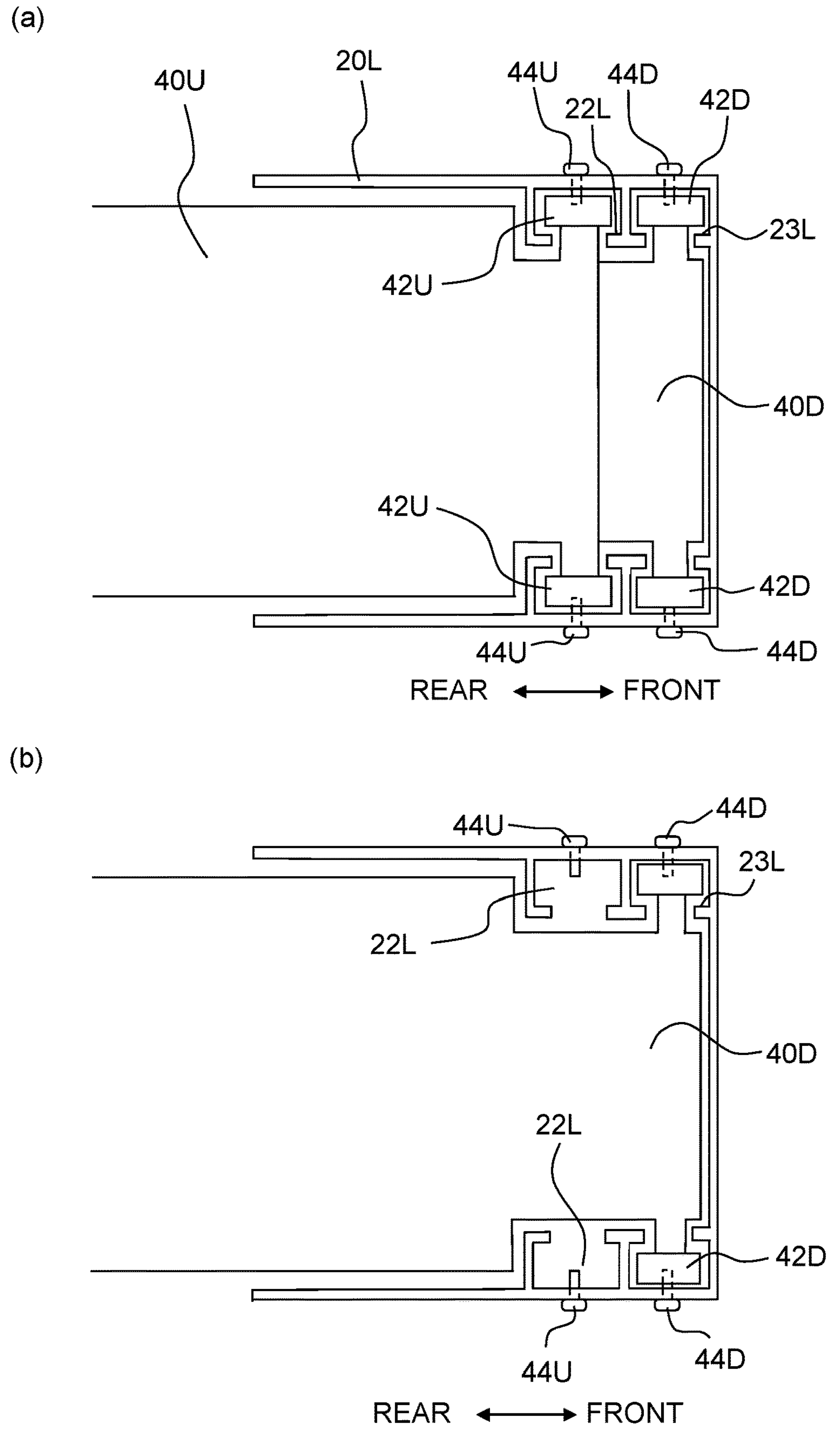
FIG. 4A is a partial cross-sectional view for illustrating a relation between a rung 40U and guide rails 22L, 23L.
FIG. 4B is a partial cross-sectional view for illustrating a relation between a rung 40D and the guide rails 22L, 23L

Referring to FIG. 3, FIG. 4A, FIG. 4B and the like, explanation is made about a positional relationship between the rungs 40U, 40D and the front leg 20L and the rear leg 30L. Since a positional relationship between the rungs 50U, 50D and the front leg 20R and the rear leg 30R is the same as the above positional relationship except that the positional relationships are symmetric in the front-rear direction, explanation of the latter positional relationship is omitted.

As depicted in FIG. 1 and FIG. 2B, the two rungs 40U, 40D extending in the front-rear direction are provided between the front leg 20L and the rear leg 30L. The rung 40U is disposed above the rung 40D. Since the interval in the front-rear direction between the front leg 20L and the rear leg 30L has the truncated chevron shape in which the interval at the lower side is slightly larger than the interval at the upper side, a length in the front-rear direction of the rung 40D is longer than a length in the front-rear direction of the rung 40U.

As described above, the cross-sectional shape of the front leg 20L is substantially the U-letter in which the end facing the rear leg 30L is opened, and the cross-sectional shape of the rear leg 30L is substantially the U-letter in which the end facing the front leg 20L is opened. The internal space that is long in the up-down direction is defined in each of the front leg 20L and the rear leg 30L. A front end of the rung 40U is inserted into the internal space of the front leg 20L, and a rear end of the rung 40U is inserted into the internal space of the rear leg 30L. As depicted in FIG. 3, a rivet 41 is provided at the rear end of the rung 40U. The rung 40U is attached to the rear leg 30L to be pivotable about a rivet 41U. As depicted in FIG. 4A, a guide roller 42U is provided at the front end of the rung 40U. The guide roller 42U is attached to the guide rail 22L. The guide roller 42U can move in the up-down direction along the guide rail 22L. As depicted in FIG. 2B, FIG. 3, and FIGS. 4A, 4B, the guide rail 22L is provided with a stopper 44U that prevents the front end of the rung 40U from moving downward beyond a horizontal direction.

As depicted in FIG. 3, a rear end of the rung 40D is provided with a rivet 41D. The rung 40D is attached to the rear leg 30L to be pivotable around the rivet 41D. As depicted in FIG. 4B, a front end of the rung 40D is provided with a guide roller 42D. The guide roller 42D is attached to the guide rail 23L. The guide roller 42D can move in the up-down direction along the guide rail 23L. As depicted in FIG. 2B, FIG. 3, and FIGS. 4A and 4B, the guide rail 23L is provided with a stopper 44D that prevents the front end of the rung 40D from moving downward beyond the horizontal direction. The guide roller 42D of the rung 40D is attached to the guide rail 23L, and thus the guide roller 42D does not interfere with the stopper 44U attached to the guide rail 22L. Similarly, the guide roller 42U of the rung 40U is attached to the guide rail 22L. Thus, the guide roller 42U does not interfere with the stopper 44D attached to the guide rail 23L.

As described above, the front leg 20L is slidably movable in the front-rear direction along the slide rail 12L toward the rear leg 30L. Along with the slide movement of the front leg 20L, pivoting the rungs 40U, 40D upward about the rivets 41U, 41D can move the guide roller 42U upward along the guide rail 22L, and can move the guide roller 42D upward along the guide rail 23L. Accordingly, as depicted in FIG. 3, the rungs 40U, 40D are accommodated in the internal spaces of the front leg 20L and the rear leg 30L, and the front leg 20L and the rear leg 30L are positioned at the lower side of the second top board 10B. Under this state, the front leg 20L and the rear leg 30L can move toward the second top board 10B, which allows the front leg 20L and the rear leg 30L to be accommodated in the recessed second space S2 of the lower surface of the second top board 10B (see, FIGS. 5A and 5B). Similarly, the front leg 20R and the rear leg 30R can be accommodated in the recessed first space S1 of the lower surface of the first top board 10F (see, FIGS. 5A, 5B). Closing the top board 10 under this state allows the two front legs 20 and the two rear legs 30 to be accommodated in the internal space S of the top board 10 having the closed state.

<Effects of This Embodiment>

The folding stepstool 1 of this embodiment can accommodate a pair of the front leg and the rear leg in the first space of the lower surface of the first top board, and can accommodate another pair of the front leg and the rear leg in the second space of the lower surface of the second top board. Closing the top board under this state allows the two pairs to be accommodated in the internal space of the top board having the closed state. Accordingly, the folding stepstool can be folded in a substantially prism (rectangular column) shape, and is easy to carry. Since the top board 10 can also be folded in half, the folding stepstool can be downsized by being folded.

In the above embodiment, in a state where the folding stepstool 1 is in the used state, the hinge 11 is positioned at the lower side of the top board 10. The hinge 11 has a portion where a wall surface extending in the left-right direction of the first top board 10F overlaps with a wall surface extending in the left-right direction of the second top board 10B. In this configuration, the hinge 11, the wall surface extending in the left-right direction of the first top board 10F, and the wall surface extending in the left-right direction of the second top board 10B function as a reinforcement member that reinforces the top board 10. Those functioning as the reinforcement member can receive the load applied on the top board 10 during the used state, improving a load bearing property of the top board 10.

<Modified Embodiment>

The configuration of the folding stepstool according to the present disclosure is not limited to the configuration in the above embodiment, and various modifications can be made. For example, in the above embodiment, the two rungs are provided at the left side of the folding stepstool 1, and the two rungs are provided at the right side of the folding stepstool 1. The arrangement of the rungs and the number of rungs, however, are not limited thereto. For example, one rung or three or more rungs may be provided at the left side of the folding stepstool 1, and one rung or three or more rungs may be provided at the right side of the folding stepstool 1. The rungs may have the same length. The number of rungs at the left side of the folding stepstool 1 may not be different from that at the right side of the folding stepstool 1. The rung(s) may be provided at only one of the left side and the right side of the folding stepstool 1.

In the above embodiment, the front leg 20R and the rear leg 30L are not slidably movable in the front-rear direction.

However, the front leg 20R and the rear leg 30L may be configured to be slidably movable in the front-rear direction.

Figure 7:
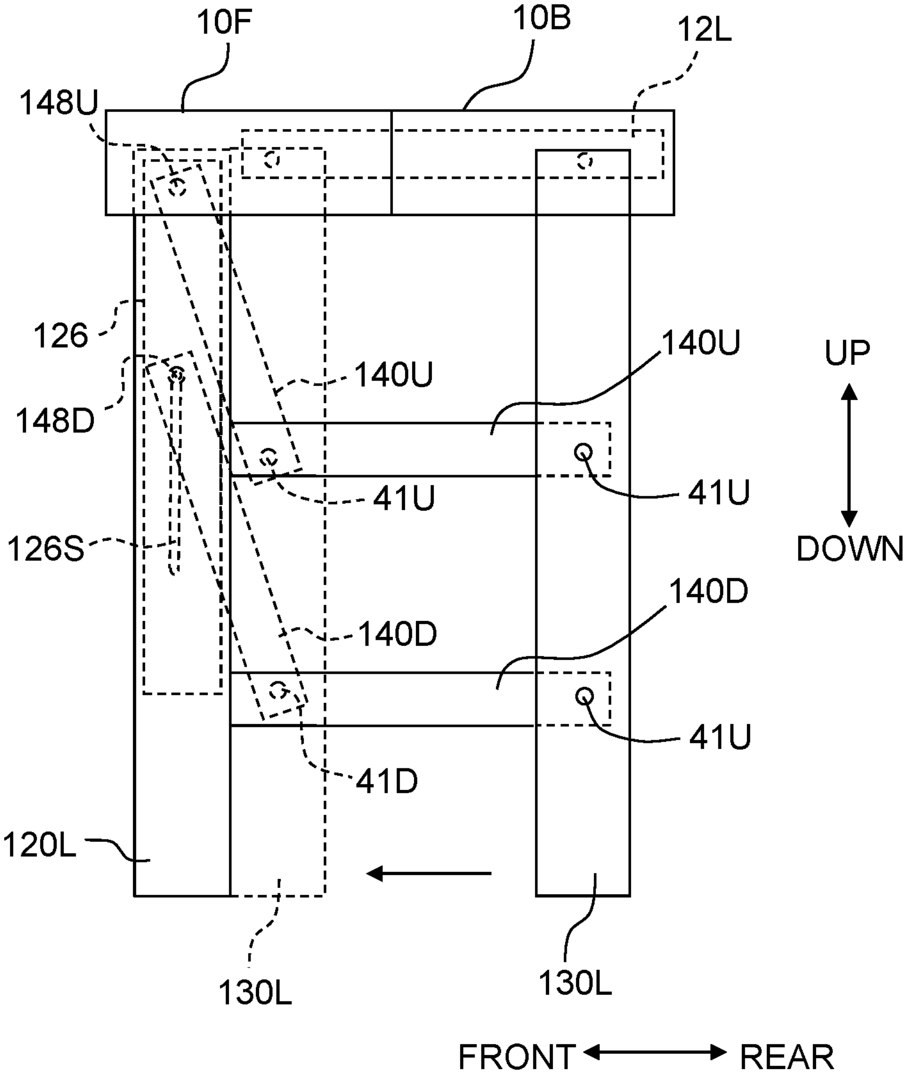
FIG. 7 is a schematic view for illustrating the folding stepstool 1 according to a modified embodiment.

Further, the end in the front-rear direction of the rung is pivotally attached to one of the front leg and the rear leg, and the other end in the front-rear direction of the rung is provided to be slidably movable in the up-down direction along the guide rail formed in the other of the front leg and the rear leg. The two guide rails are provided with the respective two rungs. The present disclosure, however, is not limited thereto. Two rungs may be attached to one guide rail. For example, as depicted in FIG. 7, a front leg 120L may include one guide rail (not depicted) and a slide support (slide prop) 126 moving in the up-down direction along the guide rail. A front end of a rung 140U is pivotally attached to the slide support 126 by using a rivet 148U provided for the slide support 126. A front end of a rung 140D is pivotally attached to the slide support 126 by using a rivet 148D provided for the slide support 126. A slit 126S extending in a longitudinal direction (up-down direction) of the slide support 126 is formed in the slide support 126. The rivet 148D is slidably movable in the up-down direction along the slit 126S. Thus, the front end of the rung 140D is slidably moveable along the slit 126S of the slide support 126.

Since the slide support 126 has the slit 126S, the front end of the rung 140D can slide and move upward together with the slide support 126, and further can slide and move upward along the slit 126S. Thus, even when the rung 140D is longer than the rung 140U, a difference in lengths of the two rungs can be absorbed. This allows the rung 140U and the rung 140D to be accommodated in the internal spaces of the front leg 120L and the rear leg 130L. Although illustration is omitted, the same configuration can be applied to a front leg and a rear leg facing the front leg 120L and the rear leg 130L in the left-right direction.

In the above embodiment, the top board 10 includes two top boards (first top board 10F and second top board 10B) coupled to each other. The present disclosure, however, is not limited thereto. The top board may include three or more top boards coupled to each other.

Figure 8:
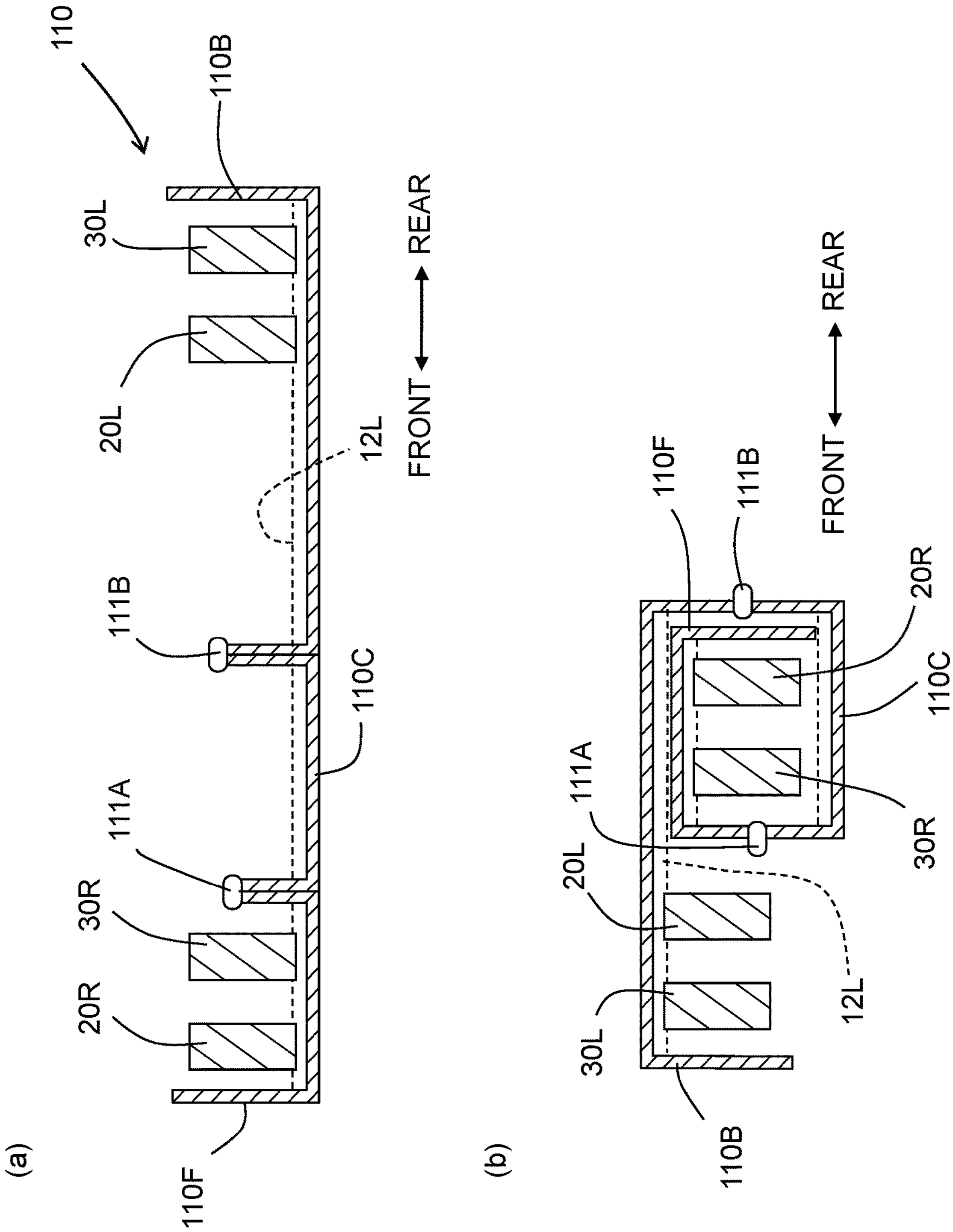
FIG. 8A is a diagram that corresponds to FIG. 5A, illustrating a state where a top board 110 is opened.
FIG. 8B is a diagram that corresponds to FIG. 5A, illustrating a state where the top board 110 is folded.

As an example, as depicted in FIGS. 8A and 8B, a top board 110 may include three top boards (first top board 110F, second top board 110C, third top board 110B). The first top board 110F is disposed at the front side of the second top board 110C. The second top board 110C is disposed at the front side of the third top board 110B. That is, the second top board 110C is positioned between the first top board 110F and the third top board 110B in the front-rear direction. As depicted in FIG. 8A, the cross-sectional shape of each of the first top board 110F, the second top board 110C, and the third top board 110B is substantially a U-letter. The first top board 110F is coupled to the second top board 110C by a hinge 111A, and the second top board 110C is coupled to the third top board 110B by a hinge 111B. As depicted in FIG. 8B, the first top board 110F can pivot about the hinge 111A to overlap with the upper side of the second top board 110C. The third top board 110B can pivot about the hinge 111B to overlap with the upper side of the first top board 110F. In this situation, the front leg 20L and the rear leg 30L positioned at the lower side of the third top board 110B and accommodated therein are positioned at the front side of the first top board 110F and the second top board 110C. The folding stepstool can be folded compactly by folding the top boards as described above, and thus the folding stepstool is easy to carry.

Figure 9:
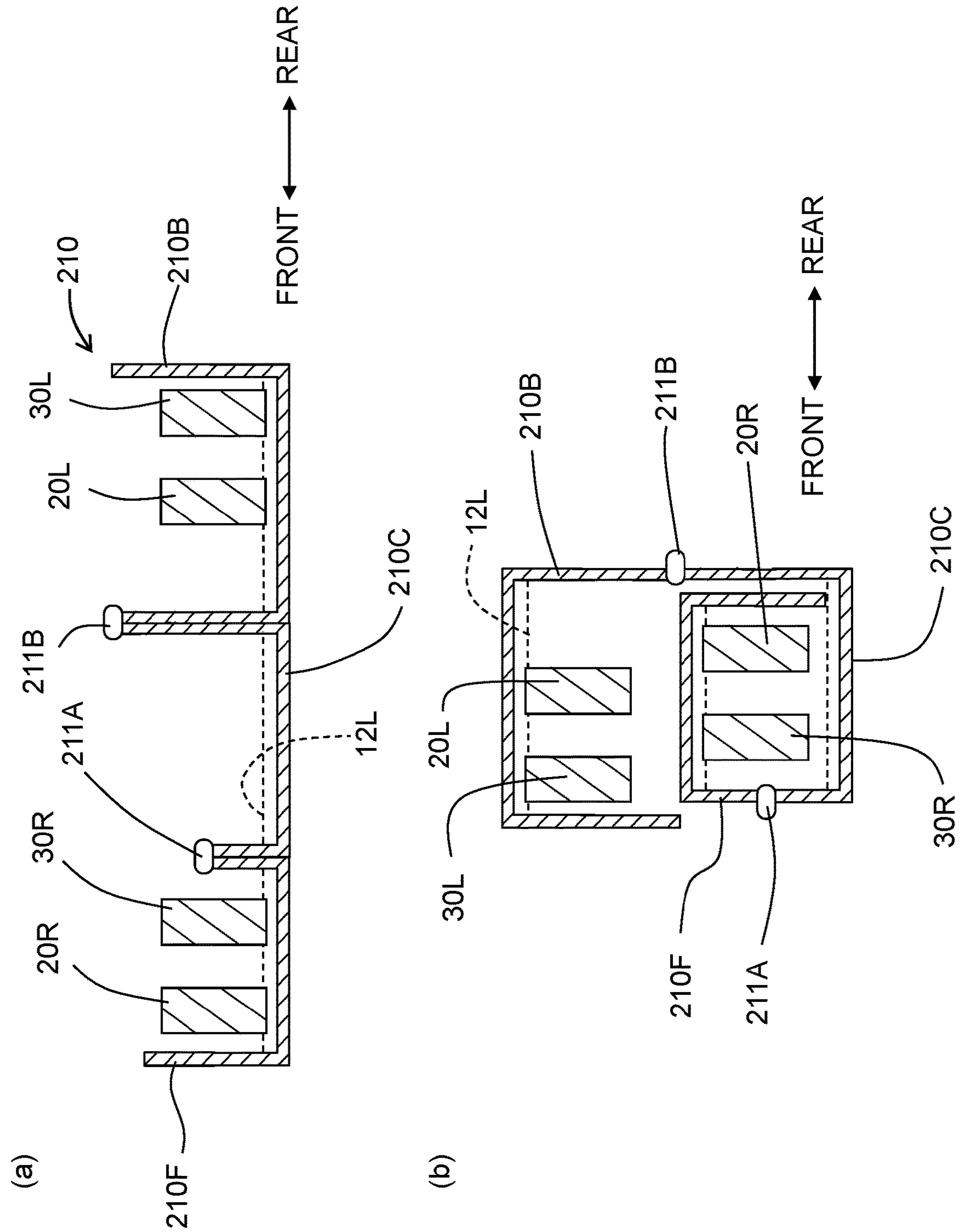
FIG. 9A is a diagram that corresponds to FIG. 5A, illustrating a state where a top board 210 is opened, and FIG.

As another example, as depicted in FIGS. 9A and 9B, a top board 210 may include three top boards (first top board 210F, second top board 210C, third top board 210B). The first top board 210F is disposed at the front side of the second top board 210C. The second top board 210C is disposed at the front side of the third top board 210B. That is, the second top board 210C is positioned between the first top board 210F and the third top board 210B in the front-rear direction. As depicted in FIG. 9A, the cross-sectional shape of each of the first top board 210F, the second top board 210C, and the third top board 210B is substantially a U-letter. The first top board 210F is coupled to the second top board 210C by a hinge 211A, and the second top board 210C is coupled to the third top board 210B by a hinge 211B. As depicted in FIG. 9B, the first top board 210F can pivot about the hinge 211A to overlap with the upper side of the second top board 210C. The third top board 210B can pivot about the hinge 211B to overlap with the upper side of the first top board 210F. In this situation, the front leg 20L and the rear leg 30L positioned at the lower side of the third top board 210B and accommodated therein are positioned at the upper side of the first top board 210F and the second top board 210C. The folding stepstool can be folded compactly by folding the top boards as described above, and thus the folding stepstool is easy to carry.

The above embodiment and the modified embodiments can be combined as appropriate. For example, the configuration of the front leg 120L having the slide support 126 as depicted in FIG. 7 can be combined with the configuration having three or more top boards as depicted in FIGS. 8A, 8B and FIGS. 9A, 9B.

The shape, material, and the like of the folding stepstool according to the present disclosure are not limited to specific ones, and may be changed as appropriate. For example, the folding stepstool may be formed from metal or aluminum. It is not indispensable to form the folding stepstool from a metal material. For example, it is possible to form the folding stepstool from a non-metal material such as wood or plastic. Further, it is possible to combine the metal material and the non-metal material as appropriate.

The invention claimed is:

1. A folding stepstool, comprising:

a top board extending in a first direction and in a second direction orthogonal to the first direction, the top board including:

a first top board having a back surface formed having a recessed first space, a second top board having a back surface formed having a recessed second space, the second top board being arranged side by side with the first top board in the first direction, and a hinge that pivotally connects the first top board and the second top board so that the back surfaces of the first top board and the second top board get closer to each other, a first leg portion provided at a first end in the second direction of a back surface of the top board, the first leg portion having a first leg disposed at the back surface of the first top board and a second leg disposed at the back surface of the second top board, a first slide rail provided at the first end in the second direction of the back surface of each of the first top board and the second top board, the first slide rail extending in the first direction to support the second leg so that the second leg is slidably movable to the back surface of the first top board, a second leg portion provided at a second end in the second direction of the back surface of the top board, the second leg portion having a third leg disposed at the back surface of the first top board and a fourth leg disposed at the back surface of the second top board, a second slide rail provided at the second end in the second direction of the back surface of each of the first top board and the second top board, the second slide rail extending in the first direction to support the third leg so that the third leg is slidably movable to the back surface of the second top board, wherein the first leg and the second leg are configured to be accommodated in the first space of the first top board in a state where the first leg and the second leg are positioned on the back surface of the first top board, the third leg and the fourth leg are configured to be accommodated in the second space of the second top board in a state where the third leg and the fourth leg are positioned on the back surface of the second top board, and the top board is configured to be pivotable so that the back surfaces of the first top board and the second top board get closer to each other in the state where the first leg and the second leg are accommodated in the first space of the first top board and in the state where the third leg and the fourth leg are accommodated in the second space of the second top board.

2. The folding stepstool according to claim 1, wherein a first rung extending in the first direction is provided between the first leg and the second leg, and the first rung is pivotally supported with respect to the first leg, and the first rung is supported to be slidably movable with respect to the second leg in an extending direction of the second leg.

3. The folding stepstool according to claim 2, wherein the first rung includes a first rung A and a first rung B, the second leg includes:

a first guide rail A extending in the extending direction of the second leg and configured to guide an end of the first rung A at a side close to the second leg in the first direction so that the end is slidably movable in the extending direction of the second leg, and a first guide rail B extending in the extending direction of the second leg and configured to guide an end of the first rung B at the side close to the second leg in the first direction so that the end is slidably movable in the extending direction of the second leg, and the first guide rail A and the first guide rail B are arranged at different positions in the first direction.

4. The folding stepstool according to claim 2, wherein a second rung extending in the first direction is provided between the third leg and the fourth leg, and the second rung is pivotally supported with respect to the fourth leg, and the second rung is supported to be slidably movable with respect to the third leg in an extending direction of the third leg.

5. The folding stepstool according to claim 4, wherein the second rung includes a second rung A and a second rung B, the third leg includes:

a second guide rail A extending in the extending direction of the third leg and configured to guide an end of the second rung A at a side close to the third leg in the first direction so that the end is slidably movable in the extending direction of the third leg, and a second guide rail B extending in the extending direction of the third leg and configured to guide an end of the second rung B at the side close to the third leg in the first direction so that the end is slidably movable in the extending direction of the third leg, and the second guide rail A and the second guide rail B are arranged at different positions in the first direction.

6. The folding stepstool according to claim 1, wherein the first top board includes:

a first top board A having a back surface formed having a recessed space, a first top board B having a back surface formed having a recessed space, the first top board B being disposed between the first top board A and the second top board in the first direction, and a hinge that pivotally connects the first top board A and the first top board B so that the back surfaces of the first top board A and the first top board B get closer to each other, wherein the first slide rail is configured to support the second leg so that the second leg is slidably movable to the back surface of the first top board A.

* * * * *